(12) United States Patent
Hille

(10) Patent No.: US 9,331,610 B2
(45) Date of Patent: May 3, 2016

(54) ELECTROMOTIVE FURNITURE DRIVE

(75) Inventor: Armin Hille, Bielefeld (DE)

(73) Assignee: DEWERTOKIN GMBH, Kirchlengern (DE)

( * ) Notice: Subject to any disclaimer, the term of this patent is extended or adjusted under 35 U.S.C. 154(b) by 256 days.

(21) Appl. No.: 14/114,407

(22) PCT Filed: Apr. 27, 2012

(86) PCT No.: PCT/EP2012/057779
§ 371 (c)(1),
(2), (4) Date: Jan. 27, 2014

(87) PCT Pub. No.: WO2012/146721
PCT Pub. Date: Nov. 1, 2012

(65) Prior Publication Data
US 2014/0152068 A1 Jun. 5, 2014

(30) Foreign Application Priority Data
Apr. 29, 2011 (DE) ...................... 20 2011 001 008 U

(51) Int. Cl.
*H02J 7/00* (2006.01)
*H02P 4/00* (2006.01)
*A47C 20/04* (2006.01)
(Continued)

(52) U.S. Cl.
CPC ................ *H02P 4/00* (2013.01); *A47C 1/0242* (2013.01); *A47C 20/041* (2013.01); *H02J 7/0068* (2013.01); *H02K 7/116* (2013.01);
(Continued)

(58) Field of Classification Search
CPC ... Y02T 10/7005; Y02T 10/70; Y02T 10/705; Y02T 10/7077; Y02T 90/122; Y02T 90/14; A01D 34/78; A47C 1/0242; A47C 20/041
USPC .................................................. 320/100–105
See application file for complete search history.

(56) References Cited

U.S. PATENT DOCUMENTS 7,567,050 B2  7/2009  Bellingroth
8,183,819 B2  5/2012  Sugano
(Continued)

FOREIGN PATENT DOCUMENTS

DE   199 21 146   10/2000
DE   202 07 507   10/2002
(Continued)

OTHER PUBLICATIONS

International Search Report issued by the European Patent Office in International Application PCT/EP2012/057779 on Jul. 12, 2012.

*Primary Examiner* — Binh Tat
(74) *Attorney, Agent, or Firm* — Henry M. Feiereisen LLC.

(57) ABSTRACT

An electromotive furniture drive includes an electric motor, the rotational direction of which can be reversed, a motor controller, a manual control, a battery unit, and a mains power supply device. A speed-reducing transmission is connected downstream of the electric motor and a further transmission is connected downstream of each speed-reducing transmission and the battery unit has at least one battery. To enable simple, economical and easy installation, in particular in tight installation spaces, the furniture drive has a coupling device which includes a charging device for charging the at least one battery of the battery unit. The coupling device also has a reference device, which is connected to a charging device The furniture drive is especially suited for slatted bed frames and armchairs.

15 Claims, 4 Drawing Sheets

(51) Int. Cl.
  *A47C 1/024* (2006.01)
  *H02K 7/116* (2006.01)
  *A61G 7/018* (2006.01)

(52) U.S. Cl.
  CPC ........ *A47B 2200/0056* (2013.01); *A61G 7/018* (2013.01); *A61G 2203/12* (2013.01)

(56) References Cited

U.S. PATENT DOCUMENTS

| | | |
|---|---|---|
| 2005/0275382 A1 | 12/2005 | Stessman et al. |
| 2006/0175097 A1 | 8/2006 | Pirzada |
| 2008/0012516 A1* | 1/2008 | Ctvrtnicek ................... 318/490 |
| 2010/0007293 A1* | 1/2010 | Meadors et al. .............. 318/139 |
| 2012/0194106 A1* | 8/2012 | Hille ................................. 318/3 |
| 2012/0206070 A1 | 8/2012 | Hille |

FOREIGN PATENT DOCUMENTS

| | | |
|---|---|---|
| DE | 112008000424 | 12/2009 |
| DE | 102010015916 | 9/2010 |
| DE | 102009005020 | 1/2011 |
| EP | 2 060 207 | 5/2009 |
| WO | WO 2005/025024 | 3/2005 |

* cited by examiner

ELECTROMOTIVE FURNITURE DRIVE

CROSS-REFERENCES TO RELATED APPLICATIONS

This application is the U.S. National Stage of International Application No. PCT/EP2012/057779, filed Apr. 27, 2012, which designated the United States and has been published as International Publication No. WO 2012/146721 and which claims the priority of German Patent Application, Serial No. 20 2011 001 008.2, filed Apr. 29, 2011, pursuant to 35 U.S.C. 119(a)-(d).

BACKGROUND OF THE INVENTION

The invention relates to an electromotive furniture drive, especially for seating and reclining furniture.

Such electromotive furniture drives are known in various embodiments. They are implemented as linear drives having a linearly adjustable output element or as rotational drives having a rotating output element and have proven themselves extremely well in practice. The linear drives have one or a number of electric motors, wherein a speed reduction gear is connected downstream of each motor and a further gear in the form of a threaded spindle gear for example is connected downstream of the speed reduction gear, which further gear generates a linear movement of the output element from the rotational movement of the motor. The rotational drives have at least one speed reduction gear connected downstream of the respective electric motor, wherein the last gearing element forms the output element. The output element of the respective electromotive furniture drive is connected to a fixed furniture component and/or to a movable furniture component, so that the movable furniture components are adjusted relative to one another in the event of operation of the electric motor. The furniture can be implemented as a slatted frame, worktable, bed, reclining surface, treatment couch, hospital or healthcare bed, and also a lifting device for persons such as lifters or patient lifters.

It is common practice to provide such electromotive furniture drives with a so-called mains isolation circuit, which separates such drives from the electric supply network to a higher or lesser extent when not in use.

Furniture, especially seating/reclining furniture, is furniture which is mobile within an apartment, i.e. it can be positioned or placed in a living room at different locations. A TV chair is often repositioned and can change its position within a room depending on the time of day and the available daylight. It can be disadvantageous if fixed electrical connections to a socket outlet or long cables are connected to the furniture drive. One solution to this problem occurs by rechargeable battery units (accumulators) on the piece of furniture itself. A charger can be used for charging the battery units when this is required. The piece of furniture can be moved in the room without any disturbing cables. The adjusting drives can be supplied at any time and at any location by the battery unit with electrical power for adjustment.

If the battery unit is discharged, a certain period of time is required for recharging by the charger until sufficient electric power is available for drive adjustment. For this reason power supplies are known which are not arranged as a charger but as a mains power supply for the adjusting drives. Accordingly, the rechargeable battery is associated with a charging circuit which is ideally arranged in the housing of the rechargeable battery. This can lead to disadvantages however.

If the rechargeable battery changes its shape for any reason whatsoever, the housing and the charging circuit need to be adapted accordingly. A large number of electrically identical, but also similar rechargeable batteries are available on the market, but which show relevant geometrical differences among each other. If another rechargeable battery needs to be mounted or if a supplier substantially changes the geometrical dimensions, a new housing needs to be created. This also applies in the case that the specifications or the type of the rechargeable battery changes, and therefore a similar rechargeable battery or a different rechargeable battery is provided for mounting in the furniture drive, for which reason the charging circuit needs to be changed substantially.

SUMMARY OF THE INVENTION

The invention is therefore based on the object of providing an improved electromotive furniture drive.

This object is achieved by an electromotive furniture drive, especially a seating/reclining furniture drive, including a motor controller, a manual control, a rechargeable battery unit and a mains power supply device for adjusting movable furniture components relative to each other, wherein the electromotive furniture drive includes at least one electric motor with reversibility in the direction of rotation, wherein each electric motor is provided downstream with a speed reduction gear and wherein each speed reduction gear is provided downstream with a further gear, wherein the rechargeable battery unit has at least one rechargeable battery, and wherein the mains power supply device is arranged to be connectable to the mains and the input voltage on the mains side is transformed into at least one low voltage on the output side, and includes an isolating transformer or a transformer unit for electrical isolation between the mains-bound input side and the low-voltage-providing output side for the operation of the electromotive furniture drive and for charging the at least one rechargeable battery, wherein a coupling apparatus is provided which connects the rechargeable battery unit to the mains power supply device, wherein the coupling apparatus has a charging device for charging the at least one rechargeable battery of the rechargeable battery unit.

The electromotive furniture drive is simple, inexpensive and light, and is mounted especially in the constricted space of a seating furniture and can also be used universally. It comprises a rechargeable battery unit as the power supply unit and can be connected to a power supply device which supplies both the electric power for charging the rechargeable battery unit and also the necessary high electric power for operating the electromotive furniture drive when the rechargeable battery is discharged or partially discharged.

This leads to a high level of comfort for the user, because said user does not have to consider any relevant facts for recharging the rechargeable battery and, in addition, can use the power supply device at all times when the rechargeable battery is discharged in order to further operate the electromotive furniture drive.

The coupling apparatus can be attached at any location in the piece of furniture. The electromotive furniture drive is independent of the housing size of the rechargeable battery unit because it can also be fixed at another location. Furthermore, the charging device is arranged in the coupling apparatus, so that it is arranged independent of the motor controller and the rechargeable battery unit, thus leading to an advantageous modular and compact configuration. Furthermore, a charging device which is ideally adapted to the respective type of the adjustable battery can be provided in the mounting of the electromotive furniture drive in the piece of furniture.

It is provided that the coupling apparatus comprises a reference device which is connected to the charging device. As a result, different types of charging devices can be used, e.g. integrated charging circuits.

The reference device can be connected to at least one current detection device, a rechargeable battery voltage detection device and a charging supply voltage detection device. A connected mains power supply device and the rechargeable battery unit can be recognized with their voltage states.

The reference device can comprise a voltage divider, with which it is possible in a simple way, especially in the case of a discrete and therefore inexpensive configuration, to detect the parameters of voltage and current which are necessary for charging the rechargeable battery unit.

A simple discrete configuration can be realized for the voltage divider by at least three resistors switched in series. Of these three resistors, at least one thereof can be changed in a simple way by a transistor or any other switching element for example, e.g. it can be bridged. A temporary change, e.g. bridging for a preset period of time, can occur by means of a capacitor.

In accordance with a further embodiment, the charging device can be arranged in the manner of a switched-mode power supply. For this purpose, a respective integrated circuit can be used with a switching transistor and a storage coil. It is further also possible that the charging device can be provided with a function as a step-up converter. This may be necessary when the mains power supply device supplies a charging supply voltage which lies beneath an end-of-charge voltage of the rechargeable battery unit.

As a result, the charging device can be operated both as a step-down converter and also as a step-up converter.

In a further embodiment, the charging device can be operated as a step-down converter for reducing the charging voltage of the at least one rechargeable battery of the rechargeable battery unit while the charging current I is kept constant, and the charging device can be operated as a step-up converter with a constant charging current for the at least one rechargeable battery of the rechargeable battery unit until reaching an end-of-charge voltage of the at least one rechargeable battery of the rechargeable battery unit with constant charging current, whereas the charging device can be operated as a step-up converter with a constant charging voltage from reaching the end-of-charge voltage of the at least one rechargeable battery of the rechargeable battery unit.

In a further embodiment, the coupling apparatus may comprise plug-in connections at least for the rechargeable battery unit and the mains power supply device, thus providing a large level of design freedom.

In another embodiment, the mains power supply device can be provided with switched-mode power supply.

An arrangement of the mains power supply device with a mains isolation device can be possible, thus leading to power and energy savings.

In a further embodiment, the coupling apparatus can connect the motor controller to the rechargeable battery unit and the mains power supply device, thus providing a compact configuration.

Further characterizing parts and features of a preferred embodiment are provided in the description below and are the subject matter of further sub-claims.

BRIEF DESCRIPTION OF THE DRAWING

The invention will be explained below in closer detail by reference to the drawings, wherein.

DETAILED DESCRIPTION OF PREFERRED EMBODIMENTS

Figure 1:
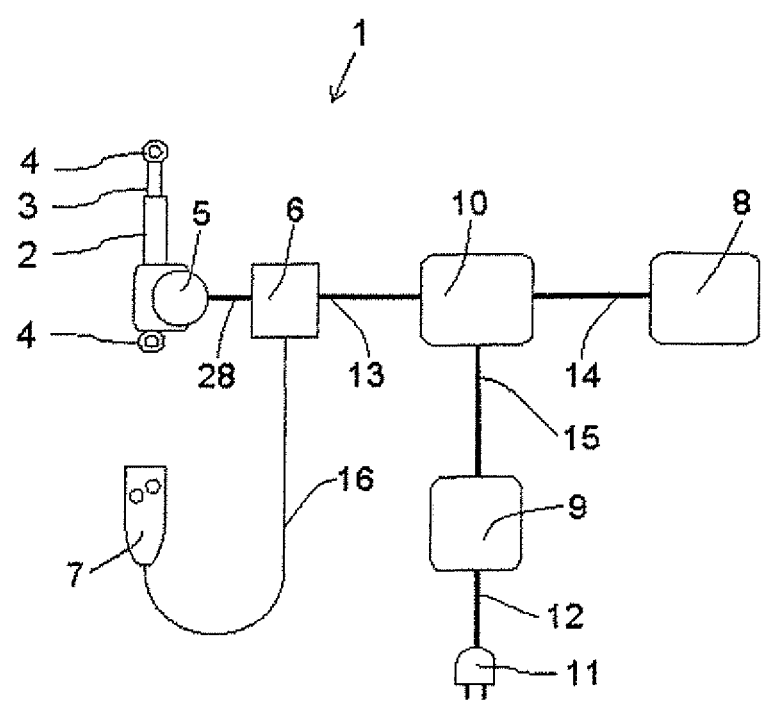
FIG. 1 shows an exemplary and schematic illustration of a furniture drive arranged as a linear drive in accordance with the invention.

FIG. 1 shows an electromotive furniture drive 1 with a rechargeable battery unit 8, a mains power supply device 9 and a coupling apparatus 10.

The electromotive furniture drive 1 is arranged in this embodiment as a so-called linear drive 2, and the mains power supply device 9 is implemented for example as a switched-mode power supply or with an isolating transformer, rectifier, and filter circuit. The linear drive 2 has a lifting pipe 3 which is extendable and retractable depending on the rotational direction of an electric motor (not shown in greater detail), on whose free end a connecting part in the form of a clevis 4 is attached. A further connecting part in the form of a further clevis 4 is fastened on the housing of the linear drive 2. The respective connecting part is connected in a way not shown in greater detail to a respective furniture component, so that during operation of the electric motor 5 the furniture components connected to the linear drive 2 move relative to one another.

As a result, the electromotive furniture drive 1 is installed in a seating furniture such as a recliner which is locally movable within an apartment. The installation space is limited in such a seating furniture, so that the drive and the power supply, i.e. the rechargeable battery unit 8 and the mains power supply device 9, need to be arranged at different locations. The rechargeable battery unit 8 is arranged within or on the seating furniture, and the mains power supply device 9 is arranged as a plug-in power unit or ground unit outside of the seating furniture. Since the seating furniture is movable, a plug-in connection is provided between the mains power supply device 9 and the electromotive furniture drive 1.

The electric motor 5 is connected to a motor controller 6, which is connected to a manual control 7 in wired form using an operating line 16. The manual control 7 comprises two pushbuttons here. According to another embodiment (not shown in greater detail), the manual control 7 is coupled via a wireless transmission link to the motor controller 6 and transmits radio waves or infrared light waves to the control unit of the at least one electric motor 5, i.e. the linear drive 2 to the motor controller 6.

According to the illustration in FIG. 1, the manual control 7 is connected to the motor controller 6 in a first embodiment, wherein the motor controller 6 is implemented as a relay controller having relay switches and/or as a semiconductor circuit having semiconductor switches. The manually operable button switches of the manual control 7 switch the control current of the relay switches or the semiconductor switches, wherein the power switches of the relay switches or the semiconductor switches switch the high motor current of the linear drive 2.

According to the illustration in FIG. 1, the manual control 7 is connected to the motor controller 6 in a second embodiment, which connects the supply line 13 and a motor line 28 of the electric motor 5 of the linear drive 2 and the electrical lines of the manually operable button switches of the manual control 7 to one another. According to this embodiment, the contacts of the manually operable button switches of the manual control 7 are implemented as power switches and switch the high motor current of the electric motor 5 of the linear drive 2 in the event of a button press. Such an embodiment of a motor controller 6 can also be understood as power distribution and/or power branching, which according to other embodiments (not shown in closer detail) is also arranged as a fixedly enclosed or cast-in distributor.

In a further developed embodiment, which is not shown in closer detail, the motor controller 6 is inserted into the housing of the linear drive 2 or is placed thereon. In another further developed embodiment, which is also not shown in closer detail, the motor controller 6 is arranged on or in the coupling apparatus 10. The linear drive 2 can be arranged in a manner of a double drive not shown in closer detail, which accommodates at least one motor, but preferably two motors, in a common housing. According to a further embodiment (not shown in closer detail), the electromotive furniture drive 1 comprises a plurality of motors, wherein a plurality of linear drives 2 and/or double drives can be used.

The supply line 13 connects the motor controller 6 to the coupling apparatus 10, either via a fixed line connection or via a plug-in connection.

The coupling apparatus 10 is connected on its part by a rechargeable battery line 14 to the rechargeable battery unit 8 and via a feed line 15 to the mains power supply device 9. These connections can also be arranged in a fixed or pluggable manner. The coupling apparatus 10 will be described below in closer detail.

The rechargeable battery unit 8 comprises a rechargeable battery which is provided for supplying the linear drive 5 when no mains power supply device 9 is connected for example.

The mains power supply device 9 is connected according to the illustration of FIG. 1 via a mains cable 12 to a mains plug 11, wherein the mains plug 11 can be arranged on the mains power supply device 9 in another embodiment not shown in closer detail. In another embodiment, a mains isolation device can be integrated in the mains power supply device 9. It needs to be mentioned that in this case the mains power supply device 9 according to the illustration of FIG. 1 is provided with an enclosing housing, so that the mains plug 11 is placed on the housing or can be integrally formed thereon.

The mains plug 11 conducts the input-side mains voltage to the mains power supply device 9 via the mains cable 12 at first, which mains power supply device 9 supplies on the secondary side a low voltage in form of a DC voltage as the operating voltage and conducts the same at first to the coupling apparatus 10. The operating voltage lies in the range of approximately 29 V for example, wherein it corresponds to specific safety regulations, and it is used on the one hand for operating the motor controller 6 and therefore the linear drive 2 and on the other hand for charging the rechargeable battery of the rechargeable battery unit 8.

The charging of the rechargeable battery unit 8 occurs by the coupling apparatus 10, which comprises the charging circuit for this purpose which will be described below in closer detail. Furthermore, the coupling apparatus 10 provides electric power to the motor controller 6 for adjusting the linear drive 2. For this purpose, it either supplies the electrical power of the mains power supply device 9 or the rechargeable battery unit 8 via the supply line 13 to the motor controller 6. If the linear drive 2 is not operated, the coupling apparatus 10 charges the rechargeable battery of the rechargeable battery unit 8 by means of the electrical power of the mains power supply device 9 when it is connected.

If only the rechargeable battery unit 8 is connected to the coupling apparatus 10, the coupling apparatus 10 supplies the motor controller with electrical power of the rechargeable battery unit 8. If the rechargeable battery unit 8 is discharged and the mains power supply device 9 is connected, the linear drive 2 is supplied with electrical power of the mains power supply device 9 during the operation of said linear drive, otherwise the rechargeable battery unit 8 is recharged with the electrical power of the mains power supply device 9.

Figure 2:
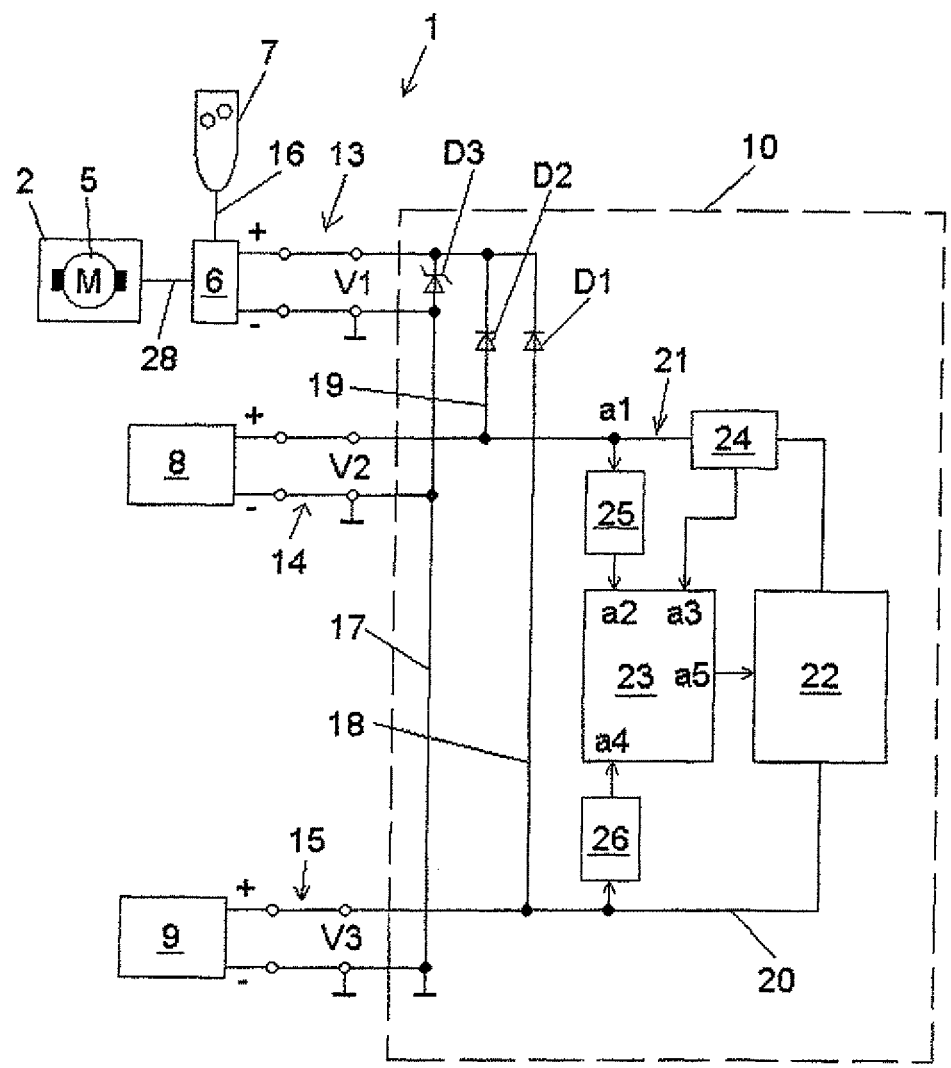
FIG. 2 shows a schematic block diagram of an embodiment the furniture drive according to FIG. 1.

FIG. 2 shows a schematic block diagram of an embodiment of a furniture drive 1 according to FIG. 1.

The coupling apparatus 10 is arranged in this embodiment in a separate housing and comprises terminal connections V1 to V3 for connecting the motor controller 6 by means of a supply line 13 to the terminal connection V1, the rechargeable battery unit 8 via the rechargeable battery line 14 to the terminal connection V2, and the mains power supply device 9 via a feed line 15 to the terminal connection V3. FIG. 2 shows the state in which the rechargeable battery unit 8 and the mains power supply device 9 are also connected to these connections of the coupling apparatus 10 apart from the motor controller 6. These connections can be arranged in one embodiment as plug-in connections.

Furthermore, the coupling apparatus 10 comprises a positive line 18 with a diode D1 and a rechargeable battery positive line 19 with a diode D2.

The negative lines (−) of the motor controller 6, the rechargeable battery unit 8, the mains supply line 9 and the coupling apparatus 10 are connected among each other and to ground.

The positive line 18 is connected to the positive line (+) of the mains power supply device 9 by the terminal connection V3, wherein its other end is connected to the anode of the diode D1, which on its part is connected with its cathode via the terminal connection V1 to the positive line (+) of the motor controller 6. The cathode of the diode D2 is also connected to this connection, whose anode is connected with the positive rechargeable battery line 19 of the rechargeable battery unit 8 via the terminal connection V2 to the positive line (+) of the rechargeable battery unit 8. The diodes D1 and D2 are used for electrical decoupling of the positive line 18 and the positive rechargeable battery line 19.

The terminal connection 13 can also comprise a limiter diode D3 for protection against voltage peaks. In FIG. 2 the limiter diode D3 is a hot-carrier diode for example.

This allows that when the rechargeable battery unit 8 (even when it has a discharged rechargeable battery) and power supply device 9 are connected the mains power supply device 9 forms the power supply via the diode D1 for the motor controller 6. If the mains power supply device 9 is not connected (not shown), the rechargeable battery unit 8 will supply the motor controller 6 via the diode D2.

The coupling apparatus 10 further comprises a charging device 22, a reference device 23, at least one current detection device 24, a rechargeable battery voltage detection device 25 and a charging supply voltage detection device 26.

The charging device 22 is used for charging the rechargeable battery of the connected rechargeable battery unit 8. For the purpose of obtaining electrical power for charging the rechargeable battery, the charging device 22 is connected via a charging supply line 20 via the terminal connection V3 to the positive line (+) of the mains power supply device 9. One output of the charging device 22 is connected via the at least one current detection device 24 to a charging line 21 which is connected to the positive line (+) of the connected rechargeable battery unit 8, i.e. to the terminal connection V2.

A charging process occurs on the basis of reference values which are provided to the charging device 22 by the reference device 23 depending on a rechargeable battery voltage and a charging current via a connection a5. The respective charging current is determined by the at least one current detection device 24 and supplied to the reference device 23 by the connection a3. The rechargeable battery detection device 25 detects the rechargeable battery voltage of the rechargeable battery of the connected rechargeable battery unit 8 at a connection a1 on the positive line (+) of the rechargeable battery unit 8 and transfers it to the reference device 23 via a connection a2. Furthermore, the reference device 23 is connected via a connection a4 to the charging supply voltage detection device 26, which detects a voltage value of the mains power supply device 9.

The reference device 23 recognizes via the rechargeable battery voltage detection device 25, at least one current detection device 24 and the charging supply voltage detection device 26 whether only one of the rechargeable battery unit 8 and the mains power supply device 9 is connected or both thereof. Furthermore, it can determine whether the electromotive furniture drive 1, i.e. its motor controller 6, is in operation. A charging process of the rechargeable battery will only occur when the motor controller 6 is not in operation or if all motors 5 are not in operation.

The charging device 22 comprises an integrated control circuit in one embodiment, which produces the respective charging voltage and the respective charging current for the rechargeable battery unit 8 from the mains power supply device 9. For this purpose, the charging device 22 is equipped with a type of switched-mode power supply unit which is controlled by the control circuit on the basis of the values supplied by the reference device 23.

In an embodiment not shown in closer detail, the switched-mode power supply unit of the charging device is arranged as a secondary switching controller with a switching transistor, e.g. a MOS-FET, and an inductor. Said secondary switching controller is operated on the basis of a reference value as a so-called step-down converter in a specific range. It can also be operated as a so-called step-up converter. In its capacity as a step-down converter, it generates a charging voltage for the rechargeable battery which lies beneath the output voltage of the mains power supply device 9, and in its capacity as a step-up converter it generates a charging voltage for the rechargeable battery which lies over the output voltage of the mains power supply device 9.

This will be explained below in closer detail by reference to examples in connection with FIGS. 3 and 3a, which show diagrams of sections of a charging process.

Figure 3:
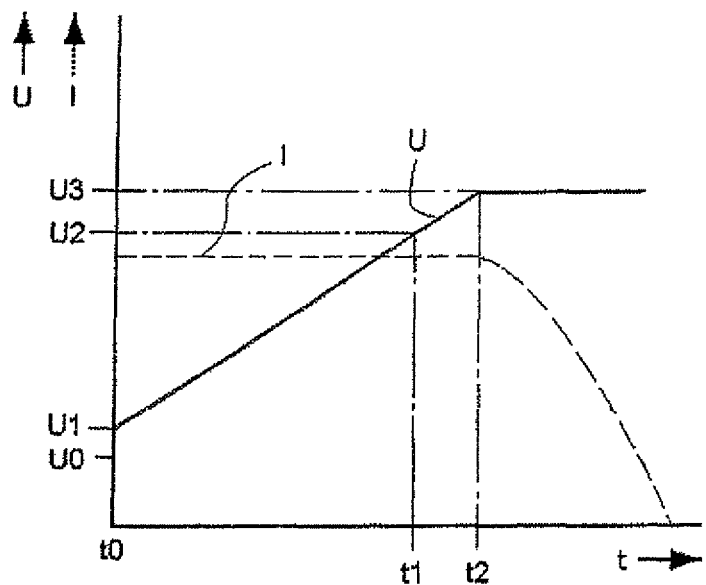
FIGS. 3 to 3a show diagrams for explaining a section of a charging process.

FIG. 3 shows the charging voltage U and a charging current I (dashed line) over time t. The dot-dashed lines are used for characterizing specific voltages and points of time.

The rechargeable battery unit 8 is a lithium-ion battery with a nominal voltage U2 of 25.2 V DC. Its start-of-charge voltage U1 lies at approximately 22 V and its end-of-charge voltage U3 is at 29.4 V. The mains supply device 9 is provided, according to respective standards, with an output voltage of 29 V and is a switched-mode power supply unit for example.

The rechargeable battery voltage of the rechargeable battery unit 8 is now determined by the rechargeable battery voltage detection device 25. When the main supply device 9 is connected, then this will be recognized by means of the charging supply voltage detection device 26. If the rechargeable battery voltage lies beneath a specific safety value, e.g. a minimal voltage U0 of 14 V, no charging process will be started. This can also be displayed or reported (not shown).

A display or a report of such processes, e.g. the start, the end or the status of a charging process or the status of the rechargeable battery unit 8, occurs by a display device or by a signaling device which is arranged as a lamp such as an LED, or an acoustic element such as a signal buzzer or a piezo beeper.

If the rechargeable battery voltage lies above the minimum voltage, e.g. 22 V, and beneath the end-of-charge voltage U3 of 29.4 V, a charging process is performed with a specific charging current I according to charging characteristics which can be adapted to the type of chargeable battery (these values can be preset in the charging device 22 in a manner not shown here). A charging current I is 350 mA for example and is kept constant from a point of time t0 at which the charging process is started with the start-of-charge voltage U1 up to a point of time t2 at which the end-of-charge voltage U3 is reached. If the end-of-charge voltage U3 of 29.4 V is reached at point of time t2, this voltage is kept constant and the charging current I is respectively reduced in the course of the further charging process.

The charging voltage U rises from the start-of-charge voltage U1 from the point of time t0 up to the point of time t1 at which the nominal voltage U2 is reached, and rises further until reaching the end-of-charge voltage U3 at point of time t2.

The charging device 22 principally comprises a so-called step-up converter if the rechargeable battery can be charged with a charging voltage of more than 29 V, or if the rechargeable battery can be charged with a charging voltage which is higher than the supply voltage provided by the main supply device 9. This is the case from point of time t1 in the diagram in FIG. 3.

From the point of time t1 to the point of time t2, the charging device 22 acts as a step-up converter, but with constant charging current I, whereas it acts from the point of time t2 as a step-up converter with constant charging current U.

The step-up converter acts from the point of time t0 until reaching the nominal voltage U2 at point of time t1 as a so-called step-down converter and reduces the charging current U while the charging current I is kept constant.

An optional deactivation of the charging current U after a previously determinable time for example is not shown.

As already described above, FIG. 3 shows the curve progression of the charging current I, which remains constant up to the point of time t2. FIG. 3 and FIG. 3a further show exemplary curves of the charging current I after the point of time t2.

In accordance with the illustration of FIG. 3 and according to a first exemplary embodiment of a charging device 22, a diagram curve of the charging current I after the point of time t2 is provided, wherein the charging current I decreases more and more with progressing time, thus providing a falling curve which is similar to a decreasing parabola branch.

Figure 3A:
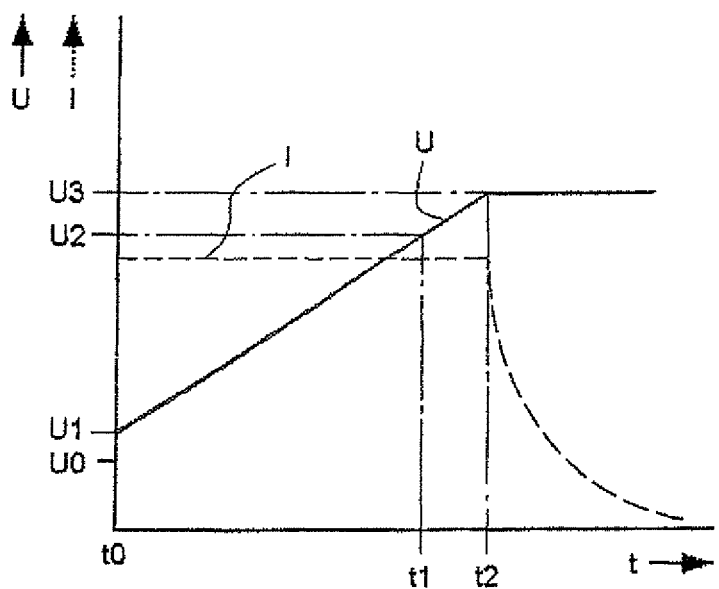

In accordance with the illustration of FIG. 3a and according to a further exemplary embodiment of a charging device 22, a diagram curve of the charging current I after the point of time t2 is provided, wherein the charging current I at the point of time t2, or in the range around the point of time t2, decreases very rapidly and steeply, so that the curve progression at the point of time t2 or in the range around point of time t2 is arranged to decrease in the manner of a sharp bend. In the further progression over time, the charging current I decreases steeply at first, wherein the charging current I approaches in the subsequent time progression a predetermined value, i.e. a charge retention current. In one embodiment of the charging device 22 and the rechargeable battery unit 8, the charge retention current will never become zero and approaches a predetermined value asymptotically, for example. In accordance with another embodiment and similar to one of the other initially described embodiments, an isolation of the charging voltage U occurs by a timer element after a predetermined period of time, wherein the charging current I will then also become zero.

Since the mains power supply device 9 only provides a maximum voltage of 29 V, the charging device 22 operates in the voltage range of 29 V up to the end-of-charge voltage U3 of 29.4 V as a step-up converter.

If the charging current drops beneath a preset charging current (e.g. 1/40 to 1/20 of the nominal capacity of the rechargeable battery of the rechargeable battery unit 8) the charging process will be deactivated. Alternatively, deactivation can also occur after a preset time.

Automatic recharging occurs when the rechargeable battery voltage drops beneath a preset value of 27 V for example.

The charging device 22 and/or the coupling apparatus 10 comprise electric/electronic fuses (not shown).

Figure 4:
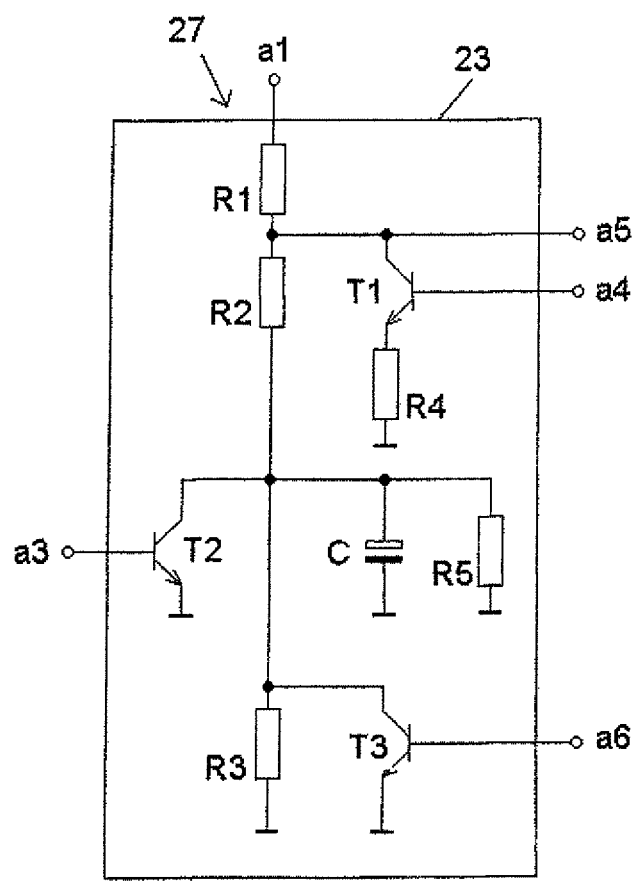
FIG. 4 shows a schematic circuit diagram of a reference device of FIG. 2.

The reference device 23 is discretely arranged in one embodiment as a voltage divider 27 and is shown in an exemplary schematic circuit diagram in FIG. 4.

The voltage divider 27 comprises at least three resistors R1, R2 and R3, which are switched in series and whose middle connection forms the connection a5 for connection to the charging device 22 (FIG. 2). The other connection of the resistance R1 is arranged as the connection a1 (FIG. 2) and the other end of the resistor R2 is connected to ground by a further resistor R3.

The middle connection of the resistors R1 and R2 to the connection a5 is connectable via a switching element (a transistor T1 in this case) to a resistor R4 connected to ground. The input of the switching element, i.e. the base of the transistor T1, forms the connection a4 (FIG. 2) for the charging supply voltage detection 26.

The transistor T1 is shown as an NPN type, but it can also be a PNP type for example. It is further possible that the resistor R4 is arranged in the collector line of the transistor T1. Furthermore, the transistor T1 can also be arranged as an adjustable resistor in form of a MOS-FET. Other arrangements (e.g. combinations) are obviously also possible.

The connecting point between the resistor R2 and the resistor R3 is connectable to ground via a further switching element (transistor T2 here) on the one hand and to ground via a resistor R5 and a capacitor C on the other hand. The base of the transistor T2 forms the connection a3 (FIG. 2) for the at least one current detection device 24.

Furthermore, said connecting point between the resistor R2 and the resistor R3 is connectable to ground via a further switching element (transistor T3 here), e.g. for current limitation of the charging current I, wherein the basis of the transistor T3 forms a connection a6 for a further parameter for the reference device 23 which will be explained below in closer detail.

The transistors (switching elements) T1, T2 and T3 influence the voltage divider 27 in such a way that they bridge or change the resistors of the voltage divider 27, thereby changing the voltage value at the reference connection a5 against ground. As a result, the different parameters of rechargeable battery voltage, charging supply voltage, charging current can have an influence on the charging device 22.

As a result, a voltage value on the base of the transistor T1 can place the resistor R4 in parallel to the resistors R2 and R3 switched in series depending on the charging supply voltage at connection a4. This also allows recognizing whether the mains power supply device 9 is connected and supplies voltage.

Transistor T2 can bridge the resistor R3 and R5 (which is parallel to R3) on the basis of a voltage value at connection a3 depending on the charging current and therefore place R2 to ground.

When the mains power supply device 9 is connected, the capacitor C forms a short circuit to ground for a time interval depending thereon, thus bridging the resistor R5 and the transistor T2. A charging process can thus be started.

The capacitor C can be discharged again when the transistor T3 switches to ground by a signal at the further connection a6. This signal can be triggered for example by a specific voltage value of the rechargeable battery voltage. Furthermore, at least one of the three resistors R1, R2, R3 which are switched in series are connected to a capacitor C for temporarily changing the voltage divider.

The embodiments described above do not limit the invention. They can be modified within the scope of the enclosed claims.

The stated voltage values for the charging voltage U and the end-of-charge voltage U3 are only provided by way of example; it is understood that they can have other values in connection with other types of rechargeable batteries.

It is possible that the voltage divider 27 is not influenced by transistors as switching elements but by electromechanical switches.

It is also possible to use other configurations of the reference device 23 instead of the voltage divider 27, e.g. fully integrated circuits.

The rechargeable battery of the rechargeable battery unit 8 can also be a type of battery other than lithium-ion batteries, e.g. a lead-gel battery, NiCd battery, etc.

If the rechargeable battery comprises rechargeable batteries with separate integrated safety circuits with terminal connections, they can be connected by means of an additional cable to the coupling apparatus 10 and its functional units.

Furthermore, a further advantage of the coupling apparatus 10 as a component arranged in a modular fashion needs to be mentioned, which is arranged to be easily and simply mountable during mounting of the electromotive furniture drive 1 and is especially designed for a group of similar types of rechargeable batteries, e.g. a group of lithium-ion batteries, and with similar storage capacity.

The embodiment shown in the drawings comprises a common negative line by way of example, which line is associated at least to the motor controller 6 and the rechargeable battery unit 8 and also the mains power supply device 9, whereas the respective positive line is effectively connected to diodes and/or at least to the charging device 22. In its electrical reversion, another embodiment (not shown in closer detail) comprises a common positive line which is associated at least with the motor controller 6 and the rechargeable battery unit 8 and also the main supply device 9, whereas its respective negative line is effectively connected to diodes and/or at least the charging device 22.

What is claimed is:

1. An electromotive furniture drive, comprising:
   a motor controller;
   a manual control operably connected to the motor controller;
   a rechargeable battery unit having at least one rechargeable battery;
   a mains power supply device arranged for connection to a mains and configured for adjusting movable furniture components relative to each other, said mains power supply device being configured to transform an input voltage on a mains side into at least one low voltage on an output side and including an isolating transformer or a transformer unit for electrical isolation between a mains-bound input side and the output side for operation of the electromotive furniture drive and for charging the at least one rechargeable battery;

at least one electric motor configured for operation in opposite directions of rotation;

a speed reduction gear arranged downstream of the electric motor;

a gear arranged downstream of the speed reduction gear; and a coupling apparatus connecting the rechargeable battery unit to the mains power supply device, said coupling apparatus having a charging device for charging the at least one rechargeable battery of the rechargeable battery unit.

2. The electromotive furniture drive of claim 1, constructed in the form of a seating/reclining furniture drive.

3. The electromotive furniture drive of claim 1, wherein the coupling apparatus comprises a reference device which is connected to the charging device.

4. The electromotive furniture drive of claim 3, wherein the reference device is connected to at least one current detection device, a rechargeable battery voltage detection device, and a charging supply voltage detection device.

5. The electromotive furniture drive of claim 3, wherein the reference device comprises a voltage divider.

6. The electromotive furniture drive of claim 5, wherein the voltage divider comprises at least three resistors which are switched in series.

7. The electromotive furniture drive of claim 6, wherein the at least three resistors are connected to switching elements configured for changing at least one of the three resistors switched in series.

8. The electromotive furniture drive of claim 6, wherein at least one of the three resistors is connected to a capacitor for temporarily changing the voltage divider.

9. The electromotive furniture drive of claim 1, wherein the charging device is configured in a manner of a switched-mode power supply unit.

10. The electromotive furniture drive of claim 9, wherein the charging device is configured for operation as a step-down converter or as a step-up converter.

11. The electromotive furniture drive of claim 9, wherein the charging device is configured to operate in one of three ways, a first way as a step-down converter for reducing a charging voltage of the at least one rechargeable battery of the rechargeable battery unit while a charging current is kept constant, a second way as a step-up converter with a constant charging current for the at least one rechargeable battery of the rechargeable battery unit until reaching an end-of charge voltage of the at least one rechargeable battery of the rechargeable battery unit with constant charging current, a third way as a step-up converter with a constant charging voltage when reaching the end-of-charge voltage of the at least one rechargeable battery of the rechargeable battery unit.

12. The electromotive furniture drive of claim 1, wherein the coupling apparatus comprises plug-in connections at least for the rechargeable battery unit and the mains power supply device.

13. The electromotive furniture drive of claim 1, wherein the mains power supply device comprises a switched-mode power supply unit.

14. The electromotive furniture drive of claim 1, wherein the mains power supply device comprises a mains isolation device.

15. The electromotive furniture drive of claim 1, wherein the coupling apparatus connects the motor controller to the rechargeable battery unit and the mains power supply device.

\* \* \* \* \*